United States Patent
Lee et al.

(10) Patent No.: US 11,296,748 B2
(45) Date of Patent: Apr. 5, 2022

(54) NETWORK MANAGEMENT APPARATUS, CUSTOMER PREMISES EQUIPMENT REGISTRATION METHOD THEREFOR, AND METHOD FOR PROVIDING INTERNET SERVICE TO CUSTOMER PREMISES EQUIPMENT

(71) Applicant: KT CORPORATION, Gyeonggi-do (KR)

(72) Inventors: Kyoung-Ju Lee, Seoul (KR); Jun Gu Lee, Jeollabuk-do (KR); Gyeong Doo Kang, Jeollabuk-do (KR); Nowook Park, Gyeonggi-do (KR); Sang Chul Seo, Gyeonggi-do (KR); Ha Sung Lee, Seoul (KR); Hyung-Jin Park, Seoul (KR); Kwangyeol Yoon, Seoul (KR); In-Taek Jeong, Daejeon (KR); Jonghak Kim, Gyeonggi-do (KR); Tae Woo Ha, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 612 days.

(21) Appl. No.: 16/300,096

(22) PCT Filed: May 11, 2017

(86) PCT No.: PCT/KR2017/004895
§ 371 (c)(1),
(2) Date: Feb. 28, 2019

(87) PCT Pub. No.: WO2017/196107
PCT Pub. Date: Nov. 16, 2017

(65) Prior Publication Data
US 2019/0207647 A1    Jul. 4, 2019

(30) Foreign Application Priority Data

May 11, 2016  (KR) .................. 10-2016-0057777
May 24, 2016  (KR) .................. 10-2016-0063691

(51) Int. Cl.
*H04B 3/32*      (2006.01)
*H04J 1/12*      (2006.01)
(Continued)

(52) U.S. Cl.
CPC .............. *H04B 3/32* (2013.01); *H04J 1/12* (2013.01); *H04J 1/16* (2013.01); *H04L 7/00* (2013.01);
(Continued)

(58) Field of Classification Search
CPC ...... H04B 3/32; H04J 1/12; H04J 1/16; H04L 7/00; H04L 12/28; H04L 25/02;
(Continued)

(56) References Cited

U.S. PATENT DOCUMENTS 6,370,159 B1    4/2002  Eidson
7,251,820 B1 *  7/2007  Jost ........................ H04H 60/51
                                                    348/E7.063

(Continued)

FOREIGN PATENT DOCUMENTS

JP      2000-148286 A      5/2000
KR   10-2012-0079993 A     7/2012
(Continued)

OTHER PUBLICATIONS

In-Taek Jeong et al., "G.996X-Based Copper Transmission Technology for Providing Giga Internet Service", TTA Journal vol. 160, Jul. 2015, pp. 68-76.
(Continued)

*Primary Examiner* — Huy D Vu
*Assistant Examiner* — Bailor C. Hsu
(74) *Attorney, Agent, or Firm* — IP Legal Services, LLC

(57) ABSTRACT

A method for registering customer premises equipment to provide an Internet service to the customer premises equipment by a network management apparatus of an access network structure, wherein the network management apparatus and the customer premises equipment are connected through a bundle cable including a plurality of lines in the access network structure, the method includes: transmitting a registration signal toward a customer premises equipment; receiving registration response signals transmitted from the customer premises equipment through the plurality of lines; analyzing the registration response signals introduced from the plurality of lines and distinguishing a direct signal transmitted through a properly connected line and interference signal from the registration response signals; and establishing a link with the customer premises equipment connected to the properly connected line. The interference signal is introduced through adjacent line of the properly connected line among the plurality of lines.

12 Claims, 8 Drawing Sheets

(51) Int. Cl.

| | | |
|---|---|---|
| *H04J 1/16* | (2006.01) | |
| *H04L 12/24* | (2006.01) | |
| *H04W 8/18* | (2009.01) | |
| *H04L 27/26* | (2006.01) | |
| *H04L 12/28* | (2006.01) | |
| *H04L 7/00* | (2006.01) | |
| *H04L 25/08* | (2006.01) | |
| *H04L 25/02* | (2006.01) | |
| *H04L 41/0806* | (2022.01) | |

(52) U.S. Cl.
CPC .............. *H04L 12/28* (2013.01); *H04L 25/02* (2013.01); *H04L 25/08* (2013.01); *H04L 27/26* (2013.01); *H04L 41/0806* (2013.01); *H04W 8/18* (2013.01)

(58) Field of Classification Search
CPC ..... H04L 25/08; H04L 27/26; H04L 41/0806; H04N 7/173; H04W 8/18
See application file for complete search history.

(56) References Cited

U.S. PATENT DOCUMENTS

| | | | |
|---|---|---|---|
| 8,914,838 B2* | 12/2014 | Okamura | H04N 7/102 725/125 |
| 2001/0055319 A1* | 12/2001 | Quigley | H04L 12/2801 370/480 |
| 2003/0235254 A1* | 12/2003 | Fanson | H04K 3/228 375/260 |
| 2007/0169162 A1* | 7/2007 | Kola | H04N 17/00 725/117 |
| 2009/0207922 A1* | 8/2009 | Yokomitsu | H04B 3/542 375/257 |
| 2010/0073219 A1* | 3/2010 | He | H04B 17/318 342/173 |
| 2011/0002295 A1* | 1/2011 | Ghosal | H04W 36/0055 370/331 |
| 2011/0200075 A1* | 8/2011 | Clevorn | H04B 1/7113 375/148 |
| 2012/0023237 A1 | 1/2012 | Lurie et al. | |
| 2012/0201286 A1 | 8/2012 | Pons et al. | |
| 2015/0201239 A1* | 7/2015 | Jackson | H04N 21/44245 725/124 |
| 2015/0288417 A1 | 10/2015 | Gomez Moreno | |
| 2016/0191354 A1* | 6/2016 | De Lassus | H04B 3/466 370/241 |
| 2016/0301447 A1 | 10/2016 | Park et al. | |
| 2016/0308581 A1 | 10/2016 | Park et al. | |
| 2017/0026079 A1 | 1/2017 | Yoon et al. | |
| 2017/0026080 A1 | 1/2017 | Jung et al. | |
| 2017/0026081 A1 | 1/2017 | Jung | |
| 2017/0026206 A1* | 1/2017 | De Lassus | H04B 3/487 |
| 2017/0201293 A1* | 7/2017 | Zhang | H04L 25/022 |

FOREIGN PATENT DOCUMENTS

| | | |
|---|---|---|
| KR | 10-2014-0064720 A | 5/2014 |
| KR | 10-1403580 B1 | 6/2014 |
| KR | 10-1474520 B1 | 12/2014 |
| KR | 10-1514046 B1 | 6/2015 |
| KR | 10-1531040 B1 | 6/2015 |
| KR | 10-1616696 B1 | 4/2016 |
| KR | 10-2016-0047005 A | 5/2016 |
| WO | 2015/152571 A1 | 10/2015 |

OTHER PUBLICATIONS

ITU-T G.9960, "Unified high-speed wireline-based home networking transceivers—System architecture and physical layer specification", Jul. 2015.

European Patent Office, Extended European Search Report of corresponding EP Patent Application No. 17796407.9, dated Sep. 27, 2019.

* cited by examiner

NETWORK MANAGEMENT APPARATUS, CUSTOMER PREMISES EQUIPMENT REGISTRATION METHOD THEREFOR, AND METHOD FOR PROVIDING INTERNET SERVICE TO CUSTOMER PREMISES EQUIPMENT

CROSS REFERENCE TO RELATED APPLICATIONS

This application is a National Stage Patent Application of PCT International Patent Application No. PCT/KR2017/004895 (filed on May 11, 2017) under 35 U.S.C. § 371, which claims priority to Korean Patent Application Nos. 10-2016-0057777 (filed on May 11, 2016) and 10-2016-0063691 (filed on May 24, 2016), the teachings of which are incorporated herein in their entireties by reference.

TECHNICAL FIELD

The present invention relates to a network management apparatus, a customer premise equipment registration method thereof, and a method for providing Internet services to the customer premise equipment.

BACKGROUND ART

As Giga Internet services has recently been commercialized and developed, existing network devices for 100 Mbps-class high-speed Internet services must adapt to network devices for the Giga Internet services.

In the case of dense buildings such as apartments, homes,—townhouses, warehouse, etc., a network device is connected to a plurality of subscriber terminals through a main distribution frame (MDF) of the building to which subscriber lines are connected. Various Internet services are provided to the subscribers according to specific subscribed Internet products and the type of subscriber lines.

In general, when a communication service uses a bundle of wiring installed in a building, end-to-end line characteristics or a combination of users simultaneously using the communication service differs from site to site. Accordingly, operating equipment of the communication service may not operate optimally, because operating methods vary depending on cable characteristics, cable length, line characteristics based on a distance of a branch point, equipment characteristics based on transmission power, or interference caused by a simultaneous usage.

However, a link may not be established in the directly connected line in the bundled access network. An interference signal (crosstalk) between adjacent lines causes the misconnection to an adjacent port or to an adjacent modem.

After a link has been established, adjacent signals may be distinguished by for example Seed ID and MAC. However, if an initial link has been incorrectly established, the quality of the communication service may be low because the initial link is not established with the best performing modem.

Meanwhile, in general, when a communication service uses a bundle of premises wiring installed in a building, end-to-end line characteristics, or a combination of users simultaneously using the communication service differs from site to site. Accordingly, it is difficult for an operating equipment of the communication service to operate optimally. The reason is because an operating method varies depending on cable characteristics or length, line characteristics according to long or short length of a branch point, equipment characteristics according to transmission power, or interference caused by a simultaneous usage.

In addition, if a large amount of transmission power or channel bandwidth is allocated to a specific cable, that cable may act as an interference for the adjacent cable, which may result in the quality problem of the communication service.

DISCLOSURE

Technical Problem

The present invention provides a method for Giga Internet service using bundled copper line cables between subscriber terminals and a concentrator in a building, and providing an optimal communication service to subscribers by eliminating errors in a link establishment and connecting the best performing modem in a Giga Internet service.

The present invention also provides a network management apparatus for mitigating interference in premises communication lines, and a method for providing Internet services to customer premises equipment using the same.

Technical Solution

An exemplary embodiment provides a method for registering customer premises equipment to provide an Internet service to the customer premises equipment by a network management apparatus of an access network structure, wherein the network management apparatus and the customer premises equipment are connected through a bundle cable including a plurality of lines in the access network structure. The method may include transmitting a registration signal toward a customer premises equipment, receiving registration response signals transmitted from the customer premises equipment through the plurality of lines, analyzing the registration response signals introduced from the plurality of lines and distinguishing a direct signal transmitted through a properly connected line and interference signal from the registration response signals, and establishing a link with the customer premises equipment connected to the properly connected line. The interference signal is introduced through adjacent line of the properly connected line among the plurality of lines.

To distinguish the direct signal and the interference signal an embodiment of the present invention may measure a signal strength of the registration response signal introduced from each line, select one or more lines having a large signal strength, and determine whether the registration response signal introduced from each of the selected lines is the direct signal or the interference signal by analyzing a channel frequency response of each of the selected lines.

The selecting one or more lines may include selecting one or more lines having the larger signal strength than a threshold or selecting a plurality of lines high ranked as the signal strength.

To determine whether the registration response signal is the direct signal or the interference signal may include calculating a characteristic curve slope in a low frequency band of the channel frequency response, and determining the registration response signal to the direct signal when the characteristic curve slope is negative, and determining the registration response signal to the interference signal when the characteristic curve slope is positive.

The characteristic curve slope may be calculated based on variation amounts from a channel frequency response value at a first frequency to a channel frequency response value at a second frequency. The first frequency may be the lowest frequency in the low frequency band, and the second frequency may be the maximum frequency in the low frequency band.

To determine whether the registration response signal is the direct signal or the interference signal may include calculating characteristic curve slopes in a plurality of low frequency band of the channel frequency response, and determining the registration response signal to the direct signal when a ratio of the negative characteristic curve slopes is high, and determining the registration response signal to the interference signal when a ratio of negative characteristic curve slopes is low.

The receiving registration response may receive a plurality of registration response signals transmitted from the customer premises equipment. To distinguish the direct signal an average value of the plurality of registration response signals may be used.

Another embodiment provides a network management apparatus that manages a plurality of lines connected to premises of Internet service subscribers. The network management apparatus may include a transceiver that transmits and receives registration signals or registration response signals with customer premises equipment. A memory that stores a program for registering the customer premises equipment in the network management apparatus. A processor that executes an operation implemented by the program in conjunction with the transceiver and the memory. The program includes instructions for transmitting the registration signal toward a customer premises equipment, receiving registration response signals transmitted from the customer premises equipment through the plurality of lines, analyzing the registration response signals introduced from the plurality of lines and distinguishing a direct signal transmitted through a properly connected line and interference signal from the registration response signals, and establishing a link with the customer premises equipment connected to the properly connected line. The interference signal is introduced through adjacent line of the properly connected line among the plurality of lines.

The program may include instructions for measuring a signal strength of the registration response signal introduced from each line, selecting one or more lines having a large signal strength, and determining whether the registration response signal introduced from each of the selected lines is the direct signal or the interference signal by analyzing a channel frequency response of each of the selected lines.

The program may include instructions for selecting one or more lines having the larger signal strength than a threshold or selecting a plurality of lines high ranked as the the signal strength.

The program may include instructions for calculating a characteristic curve slope in a low frequency band of the channel frequency response, and determining the registration response signal to the direct signal when the characteristic curve slope is negative and determining the registration response signal to the interference signal when the characteristic curve slope is positive.

The program may include instructions for calculating the characteristic curve slope based on variation amounts from a channel frequency response value at a first frequency to a channel frequency response value at a second frequency. The first frequency may the lowest frequency in the low frequency band, and the second frequency may the maximum frequency in the low frequency band.

The program may include instructions for calculating characteristic curve slopes in a plurality of low frequency band of the channel frequency response, and determining the registration response signal to the direct signal when a ratio of the negative characteristic curve slopes is high, and determining the registration response signal to the interference signal when a ratio of negative characteristic curve slopes is low.

The transceiver may receive a plurality of registration response signals transmitted from the customer premises equipment. The program may include instructions for distinguishing the direct signal and the interference signal by using an average value of the plurality of registration response signals.

The network management apparatus includes a channel estimator analyzing response signals applied through a plurality of lines from the customer premises equipment and distinguishing a direct signal transmitted through a properly connected line among the plurality of lines and an interference signal introduced through an adjacent line among the plurality of lines. A controller establishing a link with the customer premises equipment connected through the properly connected line and controlling data transmission and reception with the customer premises equipment: and a pairing unit establishing the link with the customer premises equipment by transmitting and receiving a signal having a unique frequency.

The channel estimator may measure a signal strength of the registration response signal introduced from each line, select one or more lines having a large signal strength, and determine whether the registration response signal introduced from each of the selected lines is the direct signal or the interference signal by analyzing a channel frequency response of each of the selected lines.

The channel estimator may calculate a characteristic curve slope in a low frequency band of the channel frequency response, and determine the registration response signal to the direct signal when the characteristic curve slope is negative, and determine the registration response signal to the interference signal when the characteristic curve slope is positive.

The channel estimator may calculate the characteristic curve slope based on variation amounts from a channel frequency response value at a first frequency to a channel frequency response value at a second frequency. The first frequency may be the lowest frequency in the low frequency band, and the second frequency may be the maximum frequency in the low frequency band.

The channel estimator may calculate characteristic curve slopes in a plurality of low frequency band of the channel frequency response, and determine the registration response signal to the direct signal when a ratio of the negative characteristic curve slopes is high, and determining the registration response signal to the interference signal when a ratio of negative characteristic curve slopes is low.

Yet another embodiment provides a method for providing an Internet service to customer premises equipment by a network management apparatus of an access network structure, wherein one or more network management apparatus and one or more customer premises equipment are connected to each other through a bundle cable in the access network structure. The method includes pairing with a customer premises equipment by transmitting and receiving a pairing pulse signal which is pre-assigned to each of the ports, transmitting, to a server, a seed ID requesting message for changing or newly registering a domain ID, and establishing a link with the customer premises equipment using the seed ID received from the server.

The access network structure may include a first network management apparatus and a second network management apparatus connected to the common bundle cable. The first network management apparatus may transmit the timing information to the second network management apparatus.

The second network management apparatus may synchronize with the first network management apparatuses using the timing information for operation.

The timing information may be transmitted from the first network management apparatus to the second network management apparatus through one or more of a UTP cable, an optical fiber cable, and a coaxial cable.

Yet another embodiment provides a method for providing an Internet service to customer premises equipment in an access network structure in which one or more network management apparatuses and one or more customer premises equipment are connected to each other through the same bundle cable. The method includes by the network management apparatus, pairing with a customer premises equipment by transmitting and receiving a pairing pulse signal which is pre-assigned to each of the ports; by the network management apparatus, transmitting, to a server, a seed ID requesting message for changing or newly registering a domain ID; by the server, retrieving information on the network management apparatus and the customer premises equipment paired with the network management apparatus, generating a seed ID for establishing the link between the network management apparatus and the customer premises equipment, and transmitting the seed ID to the network management apparatus; and by the network management apparatus, establishing the link with the customer premises equipment using the seed ID received from the server.

The method may further include, by the server, transmitting the timing information to the network management apparatus; and by the network management apparatus, synchronizing an internal clock with the server by using the timing information and being operated.

The server may used at least one synchronization method of IEEE 1588, NTP (Network Time Protocol) and OFDM preamble (Orthogonal Frequency Division Multiplexing preamble) for transmitting the timing information to the network management apparatuses.

The access network structure may include a plurality of network management apparatuses. The method may further include first network management apparatuses, which are one or more of the plurality of network management apparatuses transmitting the timing information to a second network management apparatus, which is a peripheral network management apparatus connected through the same bundle cable.

The method may further include the second network management apparatus synchronizing with the first network management apparatuses using the timing information and being operated.

The timing information may be transmitted from the first network management apparatus to the second network management apparatus through one or more of a UTP cable, an optical fiber cable, and a coaxial cable.

Yet another embodiment provides a network management apparatus that manages a line connected to a premises of an Internet service subscriber includes a transceiver transmitting and receiving a signal with customer premises equipment, a memory in which a program for providing an Internet service to the customer premises equipment is stored, and a processor that executes an operation implemented by the program in conjunction with the transceiver and the memory. The program includes instructions for pairing with the customer premises equipment by transmitting and receiving a pre-assigned pulse signal, transmitting a seed ID requesting message for changing a domain ID to a server, and establishing a link with the customer premises equipment by using the seed ID received from the server.

The program may further include instructions for receiving timing information from the server, and synchronizing an internal clock with the server by using the timing information and operating the network management apparatuses.

The program may further include instructions for transmitting the timing information to peripheral network management apparatuses connected through the same bundle cable.

Advantageous Effects

According to an exemplary embodiment, it is possible to solve the disconnection problem due to incorrect link since the initial link is established properly. It is possible to provide the optimal communication service to the customer in the copper line-based Giga Internet service system.

According to an exemplary embodiment, it is possible to provide a high-quality Internet service to the customer premises equipment.

MODE FOR INVENTION

In the following detailed description, only certain exemplary embodiments have been shown and described, simply by way of illustration. As those skilled in the art would realize, the described embodiments may be modified in various different ways, all without departing from the spirit or scope. In addition, in the drawings, portions unrelated to the description will be omitted to obviously describe the present invention, and the same reference numerals are used for the same or similar components throughout the specification. In addition, a detailed description of the well-known technology is omitted.

In addition, throughout the present specification, unless explicitly described to the contrary, the word "comprise" and variations such as "comprises" or "comprising", will be understood to imply the inclusion of stated elements but not the exclusion of any other elements. In addition, the term such as "part", "module", or the like means a unit of processing at least one function or operation, and be implemented by hardware or software or be implemented by a combination of hardware and software.

In the present specification, the "network device" refers to a device installed by an Internet service provider to provide an Internet service to a subscriber.

Hereinafter, a subscriber line connection device for providing a new Internet service according to an exemplary embodiment will be described with reference to the drawings.

Figure 1:
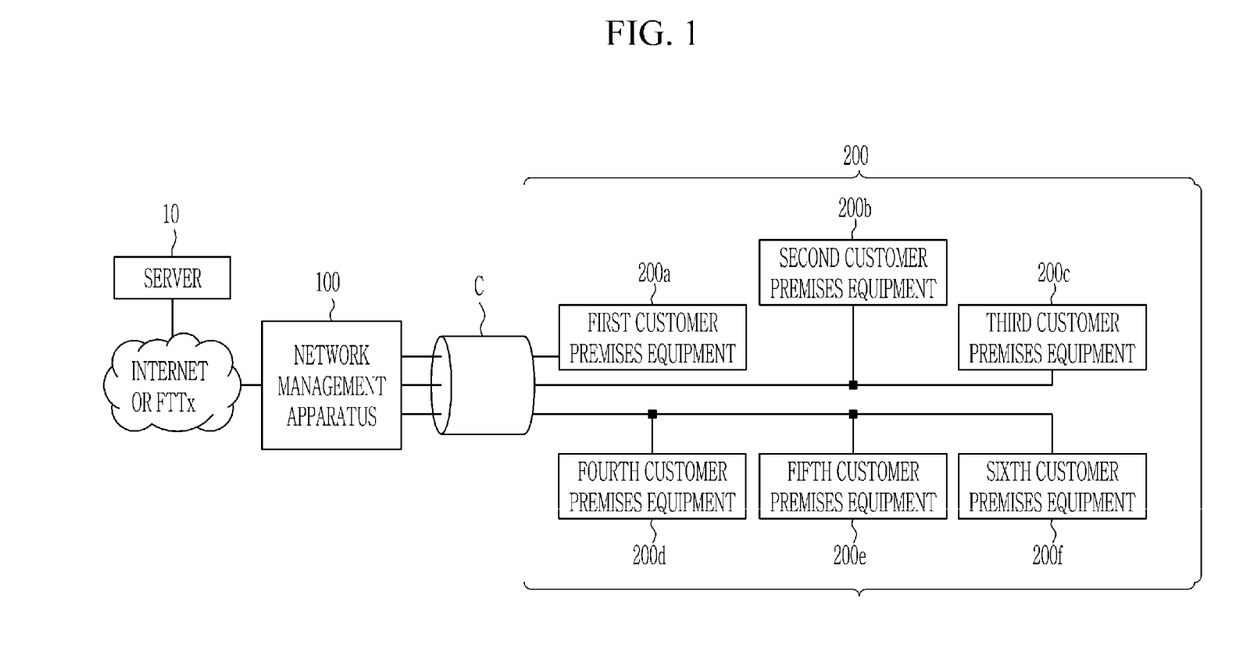
FIG. 1 is a diagram illustrating a copper line-based access network structure according to an exemplary embodiment.

FIG. 1 is a diagram illustrating a copper line-based access network structure according to an exemplary embodiment.

Referring to FIG. 1, a network management system according to an exemplary embodiment includes a server 10, at least one network management apparatus 100, and customer premises equipment 200 (200a, 200b, 200c, 200d, 200e and 200f).

The server 10 connects with at least one service provider and connects with the network management apparatus 100 through optical cables, fiber to the x (FTTx), or an Internet network. The server 10 manages an Internet service policy and a network of several customer premise equipment 200 installed at the premises of Internet subscribers.

The network management apparatus 100 is a master equipment (ME). The network management apparatus 100 and customer premises equipment (CPEs), which are subscriber modems, are connected through a bundle cable C. The network management apparatus 100 is connected to a plurality of modems through copper lines to configure a Giga Internet network. The network management apparatus 100 may be installed in a communications room or a copper terminal box of a building. The network management apparatus 100 may be referred to as a concentrator.

The network management apparatus 100 pairs with each of the customer premises equipment 200. In addition, the network management apparatus 100 connects with the customer premises equipment 200 through at least one transmission line.

The network management apparatus 100 determines the strongest (best) signal among signals from the customer premises equipment 200, and establishes a link with the customer premises equipment 200 on the correct line.

Figure 2:
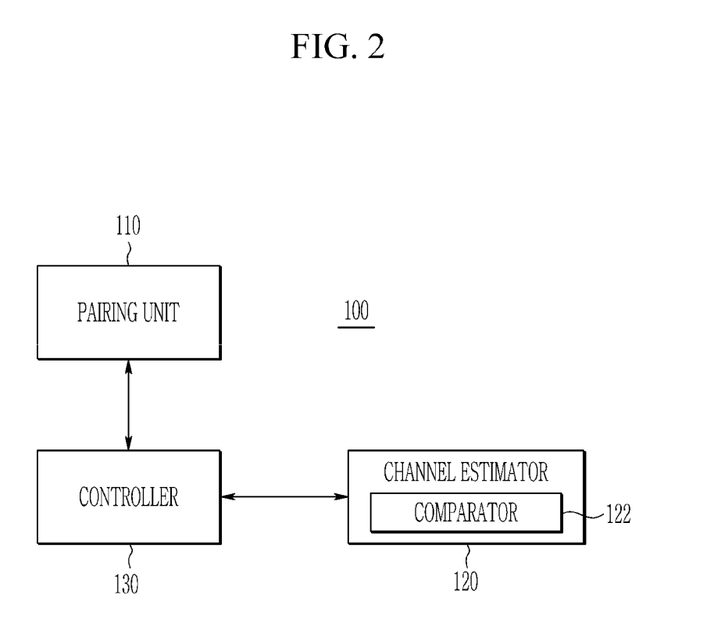
FIG. 2 is a diagram illustrating a network management apparatus according to an exemplary embodiment.

FIG. 2 is a diagram illustrating a network management apparatus according to an exemplary embodiment.

Referring to FIG. 2, the network management apparatus 100 includes a pairing unit 110, a channel estimator 120, and a controller 130.

The pairing unit 110 pairs with the customer premises equipment 200 using a signal having a unique frequency. The pairing unit 110 establishes a link with the customer premises equipment 200 by transmitting and receiving a pairing pulse signal designated to each of the ports of the network management apparatus 100. In this case, the pairing pulse signal received from the customer premises equipment 200 may include information on the customer premises equipment 200 such as an MAC address.

The channel estimator 120 transmits a registration signal/ registration message, which is a type of a test signal transmitted and received between the network management apparatus 100 and the customer premises equipment 200. The channel estimator 120 analyzes a registration response signal transmitted from the customer premises equipment 200 as a respond to the registration signal sent by the network management apparatus 100. The channel estimator 120 distinguishes a signal input through a correctly connected line and an interference signal introduced through adjacent lines among a plurality of lines.

The channel estimator 120 may transmit the registration signal for channel estimation toward a customer premises equipment 200, and may receive the registration response signals transmitted from a plurality of customer premises equipment 200 through the plurality of lines. The channel estimator 120 measures signal strengths of the registration response signals transmitted through plurality of lines. The channel estimator 120 first selects lines having strong response signals. In this case, the channel estimator 120 may include a comparator 122 for comparing the strength of the registration response signals with a predetermined value. Then the channel estimator 120 selects one or more lines having the strong registration response signal strength compared to the predetermined value. Alternatively, the channel estimator 120 may classify the registration response signals into an upper channel group and a lower channel group in the order of greater strength of the registration response signal, and select the upper channel group having strong strength of the response signal.

In addition, the channel estimator 120 analyzes a channel frequency response (CFR) of the registration response signal of the selected line, and distinguishes the direct signal transmitted through the properly connected line and the interference signal introduced from the adjacent line.

Figure 3:
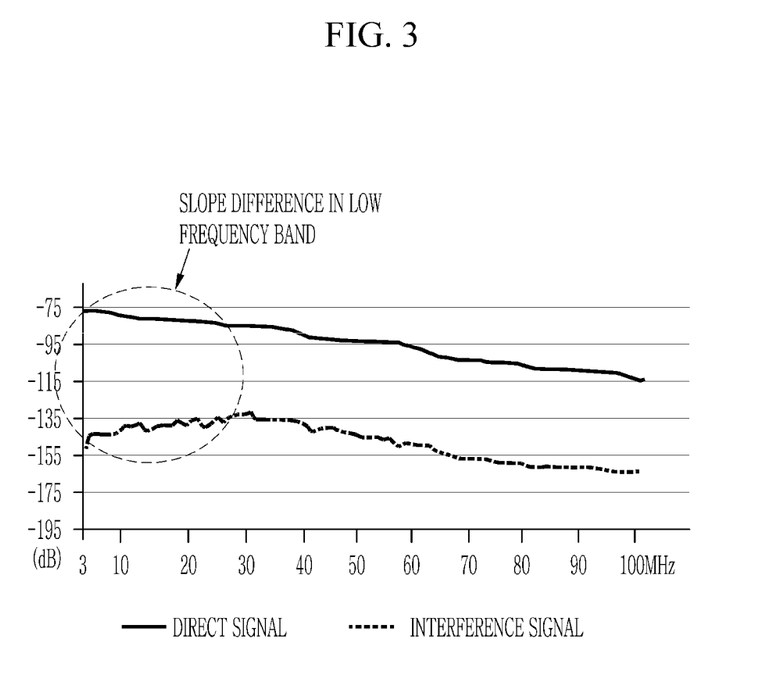
FIG. 3 is a diagram illustrating frequency domain response characteristics of a direct signal transmitted from a properly connected line and an interference signal introduced from an adjacent line of the properly connected line.

FIG. 3 a diagram illustrating frequency domain response characteristics of a direct signal transmitted from a properly connected line and an interference signal introduced from an adjacent line.

As can be seen from FIG. 3, both the direct signal (i.e., from properly connected line) input from the properly connected line and the interference signal introduced from the adjacent line, their channel frequency response characteristics decrease as the frequency changes from a low frequency to a high frequency. That is, the slope of a channel frequency response curve turns negative as the frequency changes from the low frequency to the high frequency.

However, the frequency response characteristics of the interference signal in the low frequency band increases as the frequency increases. That is, the slope of the channel frequency response curve in the low frequency band turns positive.

In the low frequency band, the slopes of the channel frequency response characteristics of the interference signal and the direct signal differ from each other. Therefore the network management apparatus 100 calculates the slope sign of the channel frequency response curve in the low frequency band and distinguishes whether the signals introduced through the lines are the direct signal or the interference signal.

That is, the channel estimator 120 analyzes whether a slope sign of the channel frequency response in the low frequency band is positive or negative. In addition, the channel estimator 120 determines that the registration response signal is the direct signal transmitted through the properly connected line when the slope sign of the channel frequency response is negative. The channel estimator 120 determines that the registration response signal is the interference signal introduced through the adjacent line when the slope sign of the channel frequency response is positive.

Next, the controller 130 establishes a link with the customer premises equipment 200 connected through the properly connected line, according to the signal characteristics determined by the channel estimator 120 as described above.

The controller 130 controls data transmission and data reception with the linked customer premises equipment 200.

The low frequency band according to the an exemplary embodiment may be about 3 to 30 MHz, but not limited thereto. Hereinafter, a method in which the channel estimator 120 of the network management apparatus 100 calculates the slope sign of the channel frequency response curve will be described in more detail.

Figure 4:
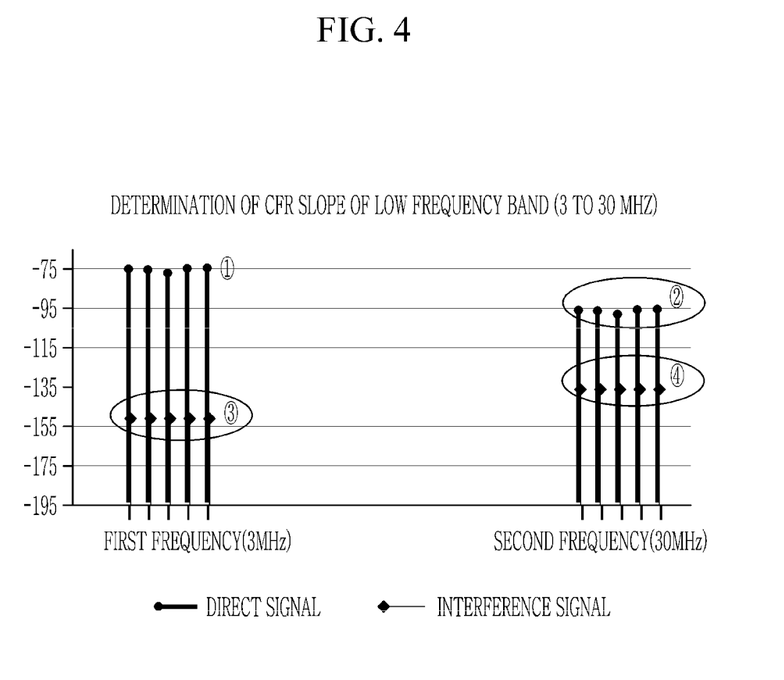
FIG. 4 is a diagram illustrating a method for determining a slope of a channel frequency response curve in a frequency band by a network management apparatus according to an exemplary embodiment.

FIG. 4 is a diagram illustrating a method for determining a slope of a channel frequency response curve in a frequency band by a network management apparatus according to an exemplary embodiment.

The channel estimator 120 compares channel frequency response values of a first frequency and a second frequency in the low frequency band with each other and calculates whether a slope of the channel frequency response curve is a positive value or a negative value.

The first frequency and the second frequency have specific frequency of the low frequency band, respectively. The channel estimator 120 determines whether the slope of the channel frequency response curve according to the frequency has a positive value or a negative value using a variation amount of the channel frequency response according to a frequency variation.

The channel estimator 120 may fix a frequency variation to a positive value by setting the first frequency smaller than the second frequency, and may calculate the slope of the channel frequency response by monitoring only the variation amount of the channel frequency response.

The first frequency is set to 3 MHz, which is the minimum frequency in the low frequency band, and the second frequency is set to 30 MHz, which is the maximum frequency in the low frequency band.

Referring to FIG. 4, a channel frequency response of the direct signal transmitted through the properly connected line at the first frequency is about "−75 dB", and the channel frequency response thereof at the second frequency is about "−95 dB". The variation amount of the channel frequency response is calculated as a negative value, "−20" (=−95+75). Accordingly, the channel estimator 120 may determine the signal that the slope of the channel frequency response has a negative value as the direct signal through the properly connected line.

On the contrary, a channel frequency response of the interference signal introduced through the adjacent line at the first frequency is about "−155 dB", and the channel frequency response thereof at the second frequency is about "−135 dB". The variation amount of the channel frequency response is calculated as a positive value, "20" (=−135+155). Accordingly, the channel estimator 120 may determine the signal that the slope of the channel frequency response has the positive value as the interference signal through the adjacent line.

The channel estimator 120 may receive registration response signals from the customer premises equipment 200, and calculate the variation amount of the channel frequency response using an average value of the channel frequency and adjacent frequency responses of the low frequency band among the plurality of registration response signals, thereby improving reliability and accuracy.

In addition, the channel estimator 120 may distinguish the direct signal and the interference signal by calculating the slope of the channel frequency response using the average value of the channel frequency responses at the minimum frequency and the maximum frequency in the low frequency band, but the present invention is limited thereto.

In another exemplary embodiment, the channel estimator 120 may divide the low frequency band into a plurality of intervals, and may distinguish the direct signal and the interference signal depending on a ratio of slope values of the plurality of divided intervals. For example, the channel estimator 120 may divide the low frequency band of 3 to 30 MHz into three intervals of 3 to 10 MHz, 10 to 20 MHz, and 20 to 30 MHz. When more than half of the intervals has the negative slope of the channel frequency response, the channel estimator 120 may determine the signal as the direct signal. Thereby, improving the accuracy and reliability of the calculation even when the signal has noise.

Figure 5:
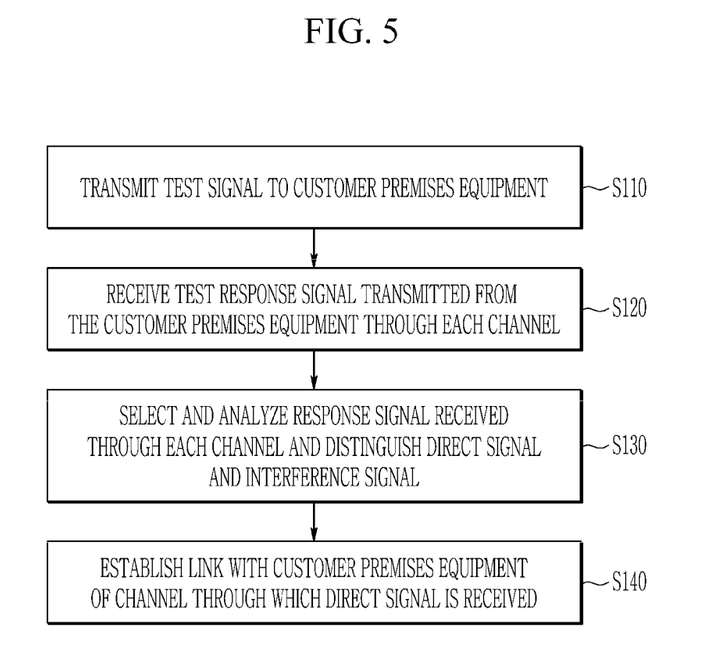
FIG. 5 is a flowchart illustrating a method for registering a customer premises equipment to provide an Internet service by a network management apparatus according to an exemplary embodiment.

FIG. 5 is a flowchart illustrating a method for registering a customer premises equipment to provide Internet service by a network management apparatus 100 according to an exemplary embodiment. The following flowchart will be described using the same reference numerals as in the configuration of FIG. 1.

Referring to FIG. 5, the network management apparatus 100 transmits a registration signal to the customer premises equipment 200 (S110). The registration signal is a test signal for determining whether a line connection between the network management apparatus 100 and the customer premises equipment 200 is normal.

When the customer premises equipment 200 receives the registration signal from the network management apparatus 100, the customer premises equipment 200 transmits a registration response signal responding the registration signal to the network management apparatus 100. However, a plurality of network management apparatuses 100 and a plurality of customer premises equipment 200 may be connected through the same bundle cable C to each other. Therefore, interference (crosstalk) may occur in the cables affected by the adjacent lines and create interference signals. In the case of not only data transmission but also an establishment of an initial link, the interference signals may establish an incorrect link with another modem instead of directly connecting with the proper (correct) customer premises equipment 200. Problems such as a link disconnection or a speed decrease of the Internet may occur due to the interference signals. Therefore, it is important to distinguish between the interference signals and the direct signal when establishing the initial link.

The network management apparatus 100 receives the registration response signals transmitted from the customer premises equipment 200 (S120).

Next, the network management apparatus 100 distinguishes the direct signal and the interference signal by selecting and analyzing the registration response signals transmitted through the plurality of lines (S130). The network management apparatus 100 primarily distinguishes the interference signal and the direct signal by first selecting lines having strong registration response signals introduced through a plurality of lines. In this case, the network management apparatus 100 may compare the strength of the registration response signal with a predetermined threshold using the comparator 122 to select only the signals of the lines having strong registration response signals compared to a predetermined threshold. The network management apparatus 100 may classify the upper channel group and the lower channel group in a descending order of the registration response signal strength to select the upper channel group having stronger strength of the response signal.

Next, the network management apparatus 100 analyzes the frequency response of the registration response signal of the selected line to distinguish the direct signal and the interference signals.

In general, the frequency response characteristics of the interference signal in the low frequency band increases as the frequency increases. That is, the slope of the channel frequency response curve according to the frequency band is positive.

The network management apparatus 100 calculates the slope sign of the channel frequency response curve according to the frequency band in the low frequency band. The network management apparatus 100 determines that registration response signal is the direct signal transmitted through the properly connected line when the slope value of the channel frequency response is negative. The network management apparatus 100 determines that the registration response signal is an interference signal introduced through the adjacent line when the slope value thereof is positive.

Next, the network management apparatus 100 establishes a link with the customer premises equipment 200 to the properly connected line receiving the direct signal and registers the customer premises equipment 200 (S140). That is, the network management apparatus 100 assigns the same seed ID to the customer premises equipment 200 and stores MAC information of the customer premises equipment 200. The MAC information is included in the registration response signal transmitted from the customer premises equipment 200. Thereby establishing a link between the network management apparatus 100 and the customer premises equipment 200.

According to an exemplary embodiment as described above, when the link between the network management apparatus 100 and the customer premises equipment 200 is established, the interference signal by the adjacent line and the direct signal by the properly connected line may be accurately distinguished to reduce errors in the link establishment, thereby providing an optimal Internet service to the subscriber.

In the network providing system according to an exemplary embodiment, even though the plurality of network management apparatuses connected to the common bundle are operated by the same timing information in a network provision structure in which device operating entities are different or synchronization technologies are different, it is possible to minimize the influence of the interference signal when providing the Internet service to subscriber terminals.

Hereinafter, a network providing structure for providing an Internet service to a customer terminal by minimizing an influence of inter-line interference according to an exemplary embodiment will be described with reference to the following drawings.

Figure 6:
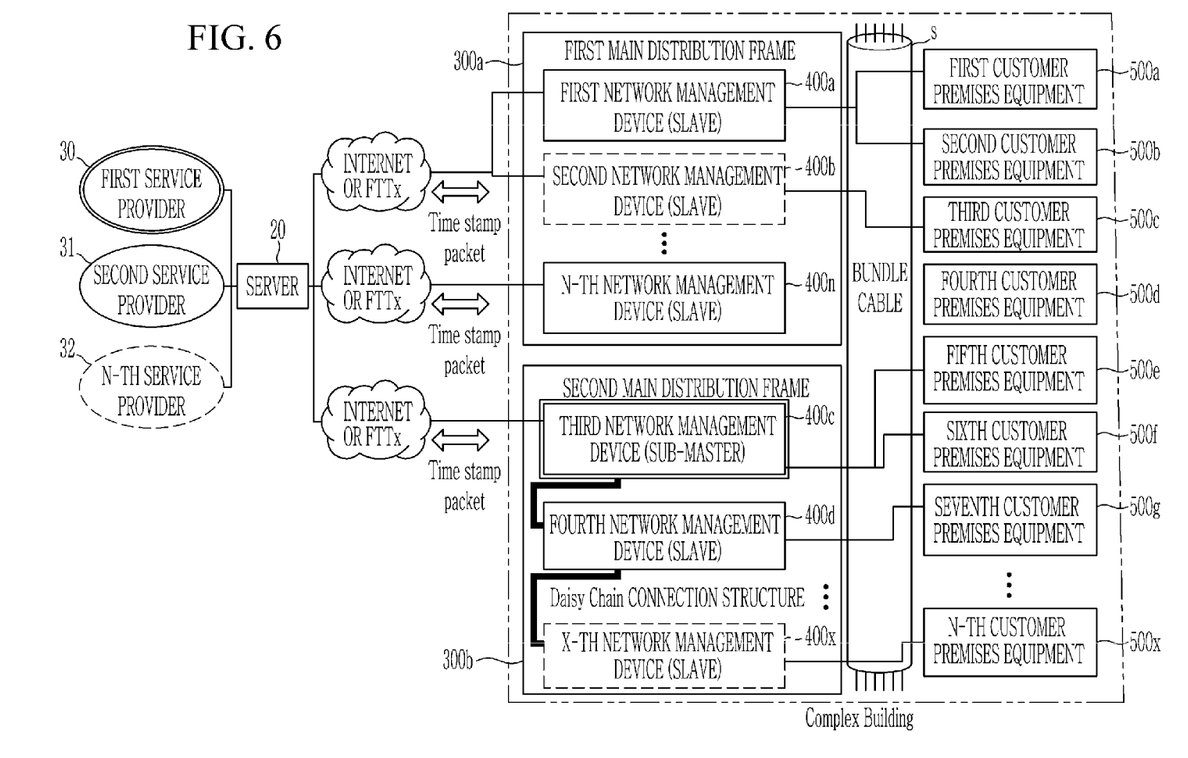
FIG. 6 is a diagram illustrating another copper line-based network structure according to another exemplary embodiment.

FIG. 6 is a diagram illustrating a copper line-based network structure according to another exemplary embodiment.

Referring to FIG. 6, the copper line-based network structure according to another exemplary embodiment includes a server 20, one or more main distribution frames 300a and 300b, one or more network management apparatuses 400a to 400x, and customer premises equipment 500a to 500x.

The server 20 is connected to a plurality of service providers 30, 31, and 32, and is connected to the main distribution frames 300a and 300b through optical cables, an Internet network or FTTx. The server 20 manages an Internet service policy and a network management.

The main distribution frame (MDF) is installed in a building by an Internet provider, and is connected to the server 20 through the optical cables. Each of the main distribution frames 300a and 330b includes one or more network management apparatuses 400a to 400x, and the network management apparatuses 400a to 400x connect a plurality of modems using copper lines to configure a Giga Internet network. The network management apparatuses 400a to 400x may be referred to as a master equipment (ME) or a concentrator. The customer premises equipment (CPEs) 500a to 500x, which are subscriber modems, are connected to a bundle cable S.

Different service providers may provide Internet services to the customer premises equipment 500a to 500x through the respective network management apparatuses 400a to 400x, and may share the bundle cable S with other providers in the same apartment or building to provide the Internet services to the customers.

In the case where the network management apparatuses 400a to 400x, that is, the concentrators are operated by different providers but sharing the bundle cable S, an interference signal (crosstalk) due to subscriber signal of an adjacent line may occur because the network management apparatuses may use different synchronization technologies.

Alternatively, even in the case in which the same provider shares the bundle cable S and operates the plurality of network management apparatuses 400a to 400x, it is difficult to directly connect the network management apparatuses 400a to 400x with inter-equipment cables. Also even through the network management apparatuses 400a to 400x are separately connected by a separate cable construction work, it is difficult to synchronize signals because external noise is mixed in the lines due to physically long extension.

In order to solve the above-mentioned problem, the network management apparatuses 400a to 400x and the customer premises equipment 500a to 500x may have a domain name and a domain ID for identifying a subscriber and an adjacent port.

The network management apparatuses 400a to 400x transmit and receive pairing pulse signals pre-assigned to each of the ports and then pair with the customer premises equipment 500a to 500x. One of the network management apparatuses 400a to 400x paired with one of the customer premises equipment 500a to 500x transmits a seed ID request message to the server 20, receives a seed ID from the server 20, and establishes a link with the one of the customer premises equipment 500a to 500x using the seed ID received from the server 20.

That is, when the domain name and the domain ID are registered in the network management apparatus and are set in the customer premises equipment, the network management apparatus and the customer premise equipment having the same domain name and domain ID may be connected to each other. Accordingly, the plurality of customer premises equipment may be separately connected to the network management apparatus regardless of interference between lines in the bundle cable S.

In general, in the case in which the network management apparatuses 400a to 400x are operated by different providers, it is difficult to integrally manage the domain names and the domain IDs assigned to the network management apparatuses 400a to 400x and the customer premise equipment 500a to 500x.

In order to solve the above-mentioned problem, in the present exemplary embodiment, the server 20 manages the domain IDs of the network management apparatuses 400a to 400x and the customer premises equipment 500a to 500x. In more detail, the server 20 generates a seed ID in response to the seed ID request message of the network management apparatuses 400a to 400x. In the present exemplary embodiment, the seed ID is assigned with specific value for each paired set, and orthogonal values may be assigned thereto. The server 20 retrieves information on the network management apparatuses 400a to 400x and the customer premises equipment 500a to 500x connected thereto, generates the seed ID having the orthogonal values in a seed pool, and transmits the seed ID to the network management apparatuses 400a to 400x.

In addition, when the links between the network management apparatuses 400a to 400x and the customer premises equipment 500a to 500x are established, the server 20 generates timing information and periodically transmits the timing information to the network management apparatuses 400a to 400x. The network management apparatuses 400a to 400x control an internal clock so as to be synchronized with the server 20 according to the timing information received from the server 20.

The server 20 (Master) may periodically transmit the timing information including a Sync message to the network management apparatuses 400a to 400x (slave) through the IEEE 1588 (Precision clock synchronization protocol for networked measurement and control systems) to synchronize a slave clock with a master clock. In the present exemplary embodiment, the internal clock may be controlled to a clock of 40 to 60 Hz.

However, the means for the server 20 to synchronize the network management apparatuses 400a to 400x is not necessarily limited thereto, and a synchronization technique such as an NTP (Network Time Protocol) or an OFDM preamble (Orthogonal Frequency Division Multiplexing preamble) may be used.

Referring to FIG. 6, the server 20 may transmit the timing information to the plurality of network management apparatuses 400a to 400n connected to the server 20 to synchronize clocks of the plurality of network management apparatuses 400a to 400n to the clock of the server 20. The server 20 transmits the timing information to any one sub-master network management apparatus 400c, and the sub-master network management apparatus 400c propagates the timing information to peripheral slave network management apparatuses 400d to 400x connected to the sub-master network management apparatus 400c using various interfaces. Thereby it is possible to synchronize the clocks of the network management apparatuses 400d to 400x using the common bundle to a clock of the sub-master network management apparatus 400c.

According to an exemplary embodiment, the network management apparatus connected to the customer terminal to provide the Internet service may establish a link with the terminal by using the seed ID received from the server and may be distinguished from the network management apparatuses operated by different providers in the common bundle without interference therewith to thereby provide a high quality Internet service.

According to an exemplary embodiment, the network management apparatus receives the timing information from the server to control the internal clock using the timing information, and propagates the timing information to the peripheral network management apparatuses to synchronize the clocks of the network management apparatuses with each other. The network management apparatus may be distinguished from the network management apparatuses operated by different providers in the common bundle without interference therewith to thereby provide the high quality Internet service.

Figure 7:
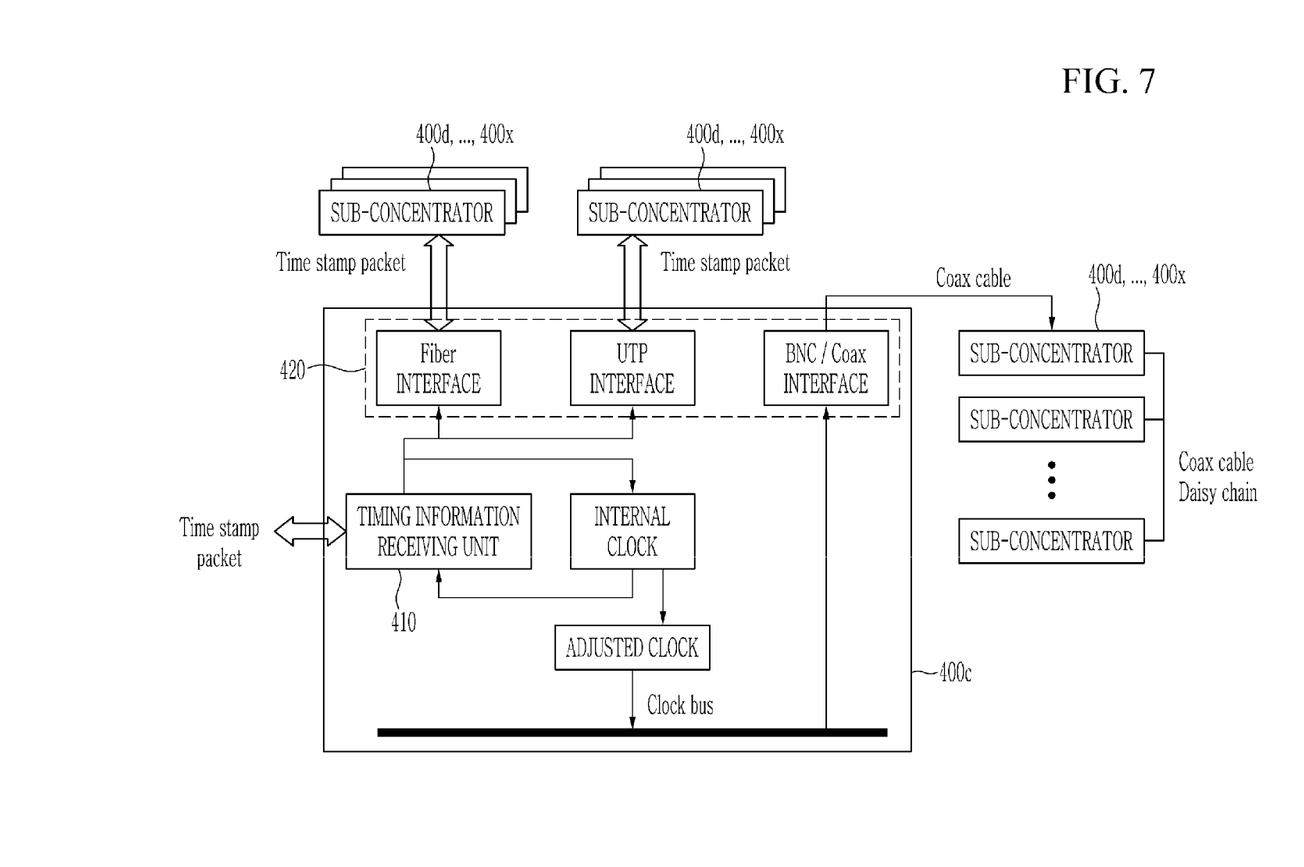
FIG. 7 is a diagram illustrating a network management apparatus according to another exemplary embodiment.

FIG. 7 is a diagram illustrating a network management apparatus according to another exemplary embodiment.

Referring to FIG. 7, the network management apparatus 400c according to an exemplary embodiment may include a timing information receiving unit 410 and an interface 420.

The timing information receiving unit 410 receives the timing information from the server 20. The network management apparatuses 400c may control the internal clock using the timing information, and may use an adjusted clock obtained by converting the internal clock for operation.

In addition, the network management apparatus 400c may propagate the timing information to the peripheral network management apparatuses 400d to 400x by using the interface 420. The interface 420 may propagate the timing information to adjacent network management apparatuses 400d to 400x by using various kinds of means such as UTP, Fiber, or Coax.

According to an exemplary embodiment as described above, in the copper line-based network structure operated by different entities, the influence of the interference signal (Crosstalk) by the subscriber signal of the adjacent line is minimized, thereby making it possible to provide the high quality Internet server to the subscriber.

Figure 8:
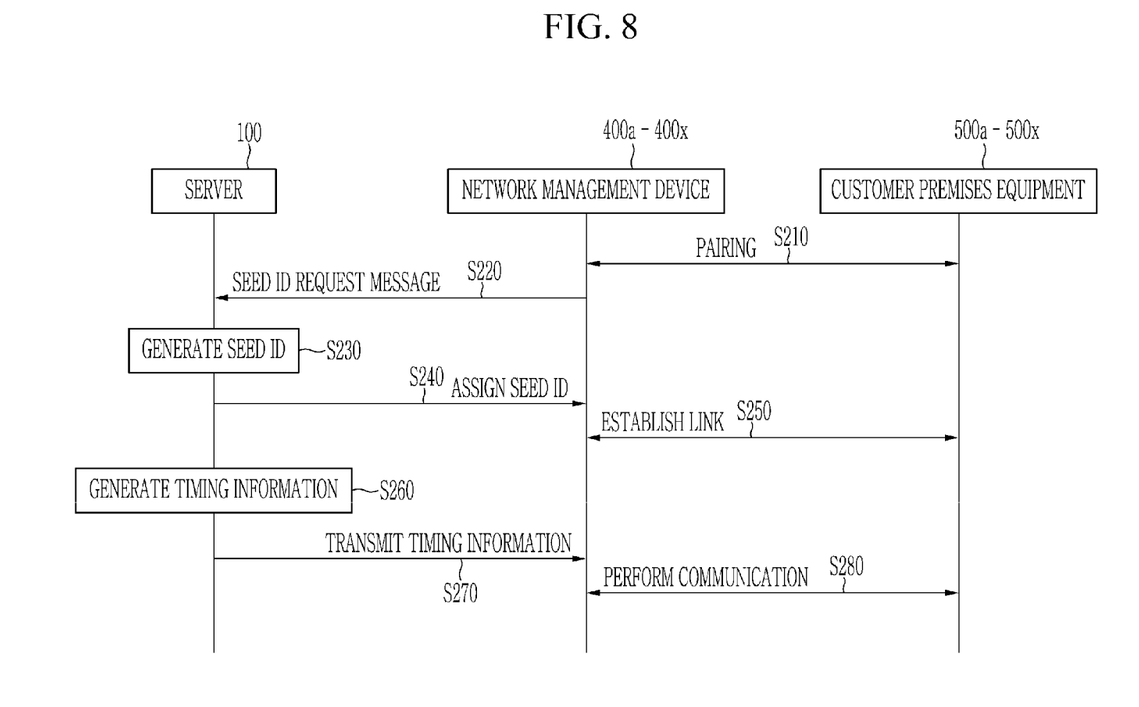
FIG. 8 is a flowchart illustrating a method for providing an Internet service to a customer premises equipment by a network management apparatus according to another exemplary embodiment.

FIG. 8 is a flowchart illustrating a method for providing the Internet service to the customer premises equipment 500a to 500x by the network management apparatuses 400a to 400x according to another exemplary embodiment. The following flowchart will be described using the same reference numerals in FIGS. 6 and 7.

Referring to FIG. 8, the network management apparatuses 400a to 400x transmit and receive a pairing pulse signal pre-assigned to each of the ports and are paired with the customer premises equipment 500a to 500x (S210).

The network management apparatuses 400a to 400x paired with the customer premises equipment 500a to 500x transmit a seed ID request message to the server 20 (S220). The seed ID is a specific value assigned for identification of each of the network management apparatuses 400a to 400x that is set to a factory initialization value. The server 20 may generate and manage the seed IDs of the network management apparatuses 400a to 400x and the customer premises equipment 500a to 500x that are connected to the server 20 (S230).

In addition, the server 20 assigns seed IDs to the network management apparatuses 400a to 400x (S240).

The network management apparatuses 400a to 400x change a default domain ID to a specific value using the seed ID assigned from the server 20, transmit a CPE registration message including the seed ID to the paired customer premises equipment 500a to 500x, and then establish the link with the customer premises equipment 500a to 500x (S250). The network management apparatuses 400a to 400x change a default domain name and a default domain ID by using the seed ID assigned from the server 20. The default domain name and the default domain ID has initialized values.

In addition, the network management apparatus 400a to 400x transmit the CPE registration message including the seed ID to the customer premises equipment 500a to 500x. And the customer premises equipment 500a to 500x change the default domain name and the default domain ID to the same value of the network management apparatuses 400a to 400x, using the seed ID transmitted from the network management apparatuses 400a to 400x. Thereby the link is established (S250).

In addition, the server 20 periodically generates the timing information and transmits the generated timing information to the network management apparatuses 400a to 400x (S260 and S270). The timing information means information for synchronizing and controlling the plurality of network management apparatuses 400a to 400x and the customer premise equipment 500a to 500x that share the bundle cable S.

The server 20 may transmit the timing information to all the network management apparatuses 400a to 400x connected to the server 20. Or the server 20 may transmit the timing information to the master network management apparatus of the network management apparatuses 400a to 400x, and the master network management apparatus may also transmit the timing information to the slave network management apparatuses which are connected thereto in various network manners.

The plurality of network management apparatuses 400a to 400x connected to the common bundle, control the internal clock using the transmitted timing information. It is possible to synchronize the plurality of network management apparatuses 400a to 400x.

Next, the network management apparatuses 400a to 400x to which the seed ID is properly assigned, are synchronized with the timing information of the server 20 to perform a communication with the customer premises equipment 500a to 500x (S280).

According to an exemplary embodiment, since the server 20 generates and manages the seed IDs for identification of the network management apparatuses and the customer premises equipment, the network management apparatuses and the customer premises equipment may be distinguished from and connected to each other even in the network provision structure in which the equipment operating entities are different or the synchronization technologies are different.

In the network provision providing according to an exemplary embodiment, even though the plurality of network management apparatuses connected to the common bundle are operated by the same timing information in a network provision structure in which device operating entities are different or synchronization technologies are different, it is possible to minimize the influence of the interference signal when providing the Internet service to the subscriber terminals.

The exemplary embodiments described above are not implemented only through the device, but may be implemented through a program for realizing the function corresponding to the configuration of the exemplary embodiment or a recording medium on which the program is recorded.

Although the exemplary embodiment has been described in detail hereinabove, the scope is not limited thereto. That is, several modifications and alterations made by a person of ordinary skill in the art using a basic concept as defined in the claims fall within the scope.

The invention claimed is:

1. A method for registering customer premises equipment to provide an Internet service to the customer premises equipment by a network management apparatus of an access network structure, wherein the network management apparatus and the customer premises equipment are connected through a bundle cable including a plurality of lines in the access network structure, the method comprising:
   transmitting a registration signal to a customer premises equipment;
   receiving registration response signals transmitted from the customer premises equipment through the plurality of lines;
   analyzing the registration response signals introduced from the plurality of lines and distinguishing a direct signal transmitted through a properly connected line and interference signal from the registration response signals; and
   establishing a link with the customer premises equipment connected to the properly connected line,
   wherein the interference signal is introduced through adjacent line of the properly connected line among the plurality of lines,
   wherein the analyzing and distinguishing comprises
      calculating a characteristic curve slope in a low frequency band of a channel frequency response of each line introducing the registration response signal,
      determining the registration response signal as the direct signal when the characteristic curve slope is negative, and
      determining the registration response signal as the interference signal when the characteristic curve slope is positive.

2. The method of claim 1, wherein the distinguishing the direct signal and the interference signal includes:
   measuring a signal strength of the registration response signal introduced from each line;
   selecting one or more lines having a strong signal strength; and
   determining whether the registration response signal introduced from each of the selected lines is the direct signal or the interference signal by analyzing a channel frequency response of each of the selected lines.

3. The method of claim 2, wherein the selecting one or more lines includes at least one of:
   selecting one or more lines having the stronger signal strength than a threshold, and
   selecting one or more lines having the stronger signal strength in an order of the signal strength.

4. The method of claim 2, wherein the determining whether the registration response signal is the direct signal or the interference signal includes:
   calculating characteristic curve slopes in a plurality of low frequency band of the channel frequency response; and
   determining the registration response signal as the direct signal when a ratio of the negative characteristic curve slopes is high, and determining the registration response signal as the interference signal when a ratio of negative characteristic curve slopes is low.

5. The method of claim 1, wherein the characteristic curve slope is calculated based on difference between a channel frequency response value at a first frequency and a channel frequency response value at a second frequency; and
   wherein the first frequency is the lowest frequency in the low frequency band, and the second frequency is the maximum frequency in the low frequency band.

6. The method of claim 1, wherein the receiving registration response receives a plurality of registration response signals transmitted from the customer premises equipment, and
   wherein the distinguishing the direct signal is based on an average signal strength of the plurality of registration response signals.

7. A network management apparatus that manages a plurality of lines connected to premiseses of Internet service subscribers, the network management apparatus comprising:
   a transceiver that transmits and receives registration signals or registration response signals with customer premises equipment;
   a memory that stores a program for registering the customer premises equipment in the network management apparatus; and
   a processor that executes an operation implemented by the program in conjunction with the transceiver and the memory,
   wherein the program includes instructions for:

transmitting the registration signal to the customer premises equipment;

receiving registration response signals transmitted from the customer premises equipment through a plurality of lines;

analyzing the registration response signals introduced from the plurality of lines and distinguishing a direct signal transmitted through a properly connected line and interference signal from the registration response signals; and establishing a link with the customer premises equipment connected to the properly connected line, wherein the interference signal is introduced through adjacent line of the properly connected line among the plurality of lines, and wherein the analyzing and distinguishing comprises calculating a characteristic curve slope in a low frequency band of a channel frequency response of each line introducing the registration response signal, determining the registration response signal as the direct signal when the characteristic curve slope is negative, and determining the registration response signal as the interference signal when the characteristic curve slope is positive.

8. The network management apparatus of claim 7, wherein the program includes instructions for:

measuring a signal strength of the registration response signal introduced from each line;

selecting one or more lines having a strong signal strength; and determining whether the registration response signal introduced from each of the selected lines is the direct signal or the interference signal by analyzing a channel frequency response of each of the selected lines.

9. The network management apparatus of claim 8, wherein the program includes instructions for at least one of:

selecting one or more lines having the larger signal strength than a threshold and selecting one or more lines in order of the the signal strength.

10. The network management apparatus of claim 7, wherein the program includes instructions for:

calculating the characteristic curve slope based on difference between a channel frequency response value at a first frequency and a channel frequency response value at a second frequency; and wherein the first frequency is the lowest frequency in the low frequency band, and the second frequency is the maximum frequency in the low frequency band.

11. The network management apparatus of claim 7, wherein the program includes instructions for:

calculating characteristic curve slopes in a plurality of low frequency band of the channel frequency response; and determining the registration response signal as the direct signal when a ratio of the negative characteristic curve slopes is high, and determining the registration response signal as the interference signal when a ratio of negative characteristic curve slopes is low.

12. The network management apparatus of claim 7, wherein the transceiver receives a plurality of registration response signals transmitted from the customer premises equipment, and wherein the program includes instructions for distinguishing the direct signal and the interference signal based on an average signal strength of the plurality of registration response signals.

\* \* \* \* \*